United States Patent [19]

Claassen et al.

[11] Patent Number: 4,522,655
[45] Date of Patent: Jun. 11, 1985

[54] METAL PIGMENT OF IMPROVED STORAGE RESISTANCE

[75] Inventors: Pamela L. Claassen, Lower Burrell; A. David Booz, New Kensington, both of Pa.

[73] Assignee: Aluminum Company of America, Pittsburgh, Pa.

[21] Appl. No.: 510,983

[22] Filed: Jul. 5, 1983

[51] Int. Cl.$^3$ ............ C04B 31/18; C08K 3/08; C09C 1/62; C09D 5/10
[52] U.S. Cl. .................... 106/290; 106/281 R; 106/283
[58] Field of Search ............ 106/290, 281 R, 283

[56] References Cited

U.S. PATENT DOCUMENTS

| | | | |
|---|---|---|---|
| 3,181,962 | 5/1965 | Rolles | 106/290 |
| 3,234,038 | 2/1966 | Stephens et al. | 106/290 |
| 3,781,177 | 12/1973 | Kondis et al. | 149/6 |
| 4,236,934 | 12/1980 | Bell | 106/290 |
| 4,292,087 | 9/1981 | Bell | 106/193 |

OTHER PUBLICATIONS

Koppers Co., Inc. Product Std. T-P-1408-0, Liquid Asphalt 460, 1 page.
Pigment Handbook, John Wiley (N.Y.) 1973; Rolles, Aluminum Flake Pigment, pp. 785-806.
Alcoa Aluminum Pigments Product Data, (1982), 23 pages.
Kirk-Othmer *Encyclopedia of Chemical Technology*, vol. 2, pp. 778-781 and pp. 797-798, "Asphalt".

Primary Examiner—Herbert S. Cockeram
Attorney, Agent, or Firm—Daniel A. Sullivan, Jr.

[57] ABSTRACT

In a composition of matter including a leafing, metallic pigment and a means for inhibiting reaction of the pigment to form hydrogen gas, the improvement including a liquid fatty acid in an amount effective for at least reducing loss of optical properties which would occur in the absence of such fatty acid.

A water-borne coating containing an effective amount of liquid fatty acid for improved optical properties.

16 Claims, No Drawings

METAL PIGMENT OF IMPROVED STORAGE RESISTANCE

SUMMARY OF THE INVENTION

It is an object of the invention to provide improved storability of inhibited, leafing, metallic pigment compositions.

Another object is to provide a water-borne coating having the ability to yield improved optical properties when pigmented.

These are well as other objects which will become apparent in the discussion that follows are achieved, according to the present invention, by providing in a composition of matter including a leafing, metallic pigment and a means for inhibiting reaction of the pigment to form hydrogen gas, the improvement comprising a liquid fatty acid in an amount effective for at least reducing loss of optical properties which would occur in the absence of such fatty acid, and by providing a water-borne coating containing an effective amount of liquid fatty acid for improved optical properties.

DESCRIPTION OF THE PREFERRED EMBODIMENTS

Various treatments have been proposed for inhibiting the reaction of water with metal pigment to form hydrogen gas.

When such treatment is applied to leafing, metallic pigment, optical properties of the pigment can be degraded. Thus, the total reflectance of a coating containing the pigment can be less, as a function of the length of time since the inhibiting treatment took place.

We have discovered that if the inhibited pigment is provided with a liquid fatty acid additive, optical properties are maintained or recaptured. The liquid fatty acid is added at a level of 1–20% based on the weight of the pigment, with a 10% level being preferred. We have also discovered that liquid fatty acid additions yield improved optical properties even in the case of leafing aluminum pigment which has not been treated for inhibiting the water reaction.

By "liquid", we mean that the fatty acid is liquid at room temperature (72° F., 22° C.). An example is isostearic acid, where, by "isostearic acid", we intend the more common meaning as explained, e.g. in U.S. Pat. No. 4,236,934 at column 5, line 28.

The distinction between leafing and non-leafing pigment is explained, for instance, in "Aluminum Flake Pigment" by Rolf Rolles in Pigment Handbook, Volume I, John Wiley & Sons (New York, 1973) and in the above-referenced U.S. Pat. No. 4,236,934. Further information, particularly on products of Aluminum Company of America, is contained in "Alcoa Aluminum Pigments Product Data", Section PAP 902, June, 1982.

Quoting from Rolles in the Pigment Handbook, page, 789,

"One of the most useful characteristics of some grades of aluminum pastes or powders is the ability of the particles to leaf or float in certain paint vehicles. When stearic acid is used as the milling lubricant in the manufacturing process of the pigment, the fatty acid is sorbed onto the pigment surface with the carboxyl group toward the metal surface. Because of this preferred orientation, the flakes have a hydrophobic, as well as an oleophobic, character. Essentially, oleophobic films behave against oils and weak polar hydrocarbons as hydrophobic films behave against water; that is, the films are not easily wetted by those compounds. The leafing properties of flake aluminum pigments are attributed to this oriented fatty acid film."

As used herein, "leafing" means a pigment having a leafing value of at least 50 per ASTM D 480-70 before any treatment for inhibiting the water reaction.

The invention is particularly applicable to leafing metal pigment treated with the class of chemicals defined in the patent application Ser. No. 510,982 of Williams and Claassen, filed July 5, 1983 for "Water Resistant Aluminum Particles and Coating", and the entire contents of that application is incorporated here by reference. A preferred inhibiting agent disclosed in that patent application is Virco-Pet 20 of Mobil Chemical Company. Thus, Virco-Pet 20 is one example of an additive which inhibits reaction of the metal pigment to form hydrogen gas. According to the reference application U.S. Ser. No. 510,982, Virco-Pet 20 is an amine neutralized acid phosphate in a toulene solution. A preferred metal is aluminum.

Typically, the pigment composition of the invention will be supplied in paste form by provision of sufficient mineral spirits to place the non-volatile content (essentially the aluminum) in the 60 to 75% range. An attractive alternative for the present invention is the substitution of water for all or part of the mineral spirits.

The invention is particularly useful in conjunction with water-borne coatings, such as asphalt emulsion coatings, where the pigment composition, including liquid fatty acid, is effective to maintain or recapture total reflectance. Besides addition in admixture with the pigment, according to other embodiments of the invention, the liquid fatty acid is added to the water-borne coating, either before or after the pigment is mixed into the coating.

Asphalt emulsions are formed essentially from asphalt, water, and a wetting agent. Other water-borne coating materials useful for the invention are shown in U.S. Pat. No. 3,918,984 and in the *Kirk-Othmer Encyclopedia of Chemical Technology*, 2nd Ed., V. 2, particularly pages 778 to 781 and 797 to 798.

Further illustrative of the present invention are the following examples.

EXAMPLES

I. Effect of Time on Total Reflectance

On day zero, Alcoa ® Grade 6230 leafing aluminum pigment was treated with 10% Virco-Pet 20 material as in Example 3 of the above-referenced application of Williams and Claassen, supplemented with the inclusion of 6% Atlas G3300 surfactant to provide a test batch of paste. Starting with a homogeneous supply of Alcoa Grade 6230 leafing aluminum pigment paste, a portion was slurried in mineral spirits (Shell ® Mineral Spirits 145EC) and filtered to a cake with a percentage NV (non-volatile) of 76. This cake was treated with Virco-Pet 20 by thorough hand-mixing with a spatula at 10% level based on aluminum weight in enough mineral spirits to create a 6230-type 65% NV paste. To illustrate the calculation for this 10% Virco-Pet 20 example, $0.10 \times (0.76 \times 1000) = 76$ grams of Virco-Pet 20 were used per 1000 grams of cake. Per 1000 grams of cake, the mineral spirits added to the cake came to 167 grams. This batch was stored at room temperature (about 72° F., 22° C.). On different numbers of days subsequent to day zero, samples of the batch were mixed into Koppers asphalt emulsion (contains water) and the resulting mixture applied as coating on panels, dried, and tested for total reflectance. Over time, total reflectance decreases, as shown in Table I.

TABLE I

Total Reflectance versus Time

| Day | Total Reflectance |
|---|---|
| 22* | 40.0/39.4 |
| 57 | 36.0/35.2 |
| 85 | 31.3 |
| 128 | 30.6 |

*Testing is not done on day zero, in order to provide for the aging period as explained in the above-referenced application of Williams and Claassen.

Total reflectance measurements were made using a Diano TR-1 total reflectometer. This instrument utilizes an integrating sphere principle to sum the light reflected in all directions.

II. Recapture of Initial Total Reflectance

A batch of Alcoa Grade 6230 leafing aluminum pigment (75% NV) was prepared as in Example 3 of the above-referenced application of Williams and Claassen on day zero and then stored at room temperature. About 325 days later, separate 42.6-gram samples were removed and mixed as follows:

a. Control mixture 42.6 grams pigment
3.3 grams mineral spirits
1.9 grams G3300 surfactant b. Isostearic mixture 42.6 grams pigment
3.2 grams Emery ® 871 isostearic acid
0.1 gram mineral spirits
1.9 grams G3300 surfactant One day later, the control mixture and the isostearic mixture were thoroughly mixed, each with 202 grams of Koppers 460 asphalt emulsion. The thus-pigmented emulsions were applied as coating on panels, dried, and tested for total reflectance.

The control gave a total reflectance of 30%, thus showing the same degradation as in I. above as compared with the total reflectance shown in Table IIB of the above-referenced application of Williams and Claassen for Example 3. In contrast, the isostearic mixture measured 42.5% in total reflectance, showing the ability of isostearic acid addition to restore total reflectance.

III. Effect of Various Amounts of Stearic and Isostearic

Using the same starting batch as in II. above, various amounts of stearic acid and isostearic acid, together with mineral spirits and surfactant, were mixed with 100-gram samples of the batch. The mix ingredients and other chracteristics are given in Table II for the stearic acid examples and in Table III for isostearic acid. Alcoa Grade 6230 leafing aluminum pigment already has stearic acid on it to impart its leafing characteristic. The amounts of stearic acid in Table II are in addition to the basic leafing-effective coating of stearic acid. This extra stearic acid was for the purpose of determining whether extra stearic acid might be able to recapture total reflectance in the manner demonstrated for isostearic acid in II. above. The isostearic examples are for the purpose of determining the effect of isostearic concentration and additionally provide experience with different mineral spirits levels.

Following storage overnight, sufficient quantities of these mixtures to provide 31.2 grams aluminum were mixed with 202 grams of Koppers 460 asphalt emulsion, then coated on panels, dried, and tested for total reflectance.

TABLE II

Extra Stearic Acid

| Example # | % stearic acid* | grams stearic acid* | grams G-3300 | grams mineral spirits* | % aluminum | grams paste = to 31.2 grams aluminum | Total Reflectance |
|---|---|---|---|---|---|---|---|
| 21136-8A | 0.25 | 0.17 | 4.1 | 9.6 | 59.9 | 52.1 | 33.4 |
| 21136-8B | 1.0 | 0.68 | 4.1 | 9.9 | 59.5 | 52.4 | 30.1 |
| 21136-8C | 2.0 | 1.36 | 4.1 | 10.1 | 59.0 | 52.9 | 30.9 |
| 21136-8D | 5.0 | 3.41 | 4.1 | 11.1 | 57.5 | 54.3 | 28.6 |

*In addition to the quantity carried by the 100-gram sample.

TABLE III

Isostearic Acid

| Example # | % isostearic acid | grams isostearic acid | grams G-3300 | grams mineral spirits* | % aluminum | grams paste = to 31.2 grams aluminum | Total Reflectance |
|---|---|---|---|---|---|---|---|
| 21136-8E | 1.0 | 0.68 | 4.1 | 9.9 | 59.5 | 52.4 | 32.8 |
| 21136-8F | 5.0 | 3.41 | 4.1 | 11.1 | 57.5 | 54.3 | 36.9 |
| 21136-8G | 10.0 | 6.82 | 4.1 | 12.7 | 55.2 | 56.5 | 39.0 |
| 21136-8H | 1.0 | 0.68 | 4.1 | 0 | 65.1 | 47.9 | 36.7 |
| 21136-8I | 5.0 | 3.41 | 4.1 | 0 | 63.4 | 49.2 | 39.7 |
| 21136-8J | 10.0 | 6.82 | 4.1 | 0 | 61.5 | 50.7 | 41.3 |

*In addition to the quantity carried by the 100-gram sample.

The total reflectance measurement results are presented in Tables II and III. If there is any effect from extra stearic acid, it would seem to be a negative one. In contrast, the recapture of lost total reflectance by isostearic acid addition is evident, with recapture improving with increasing isostearic addition. In terms of the effectiveness of the isostearic addition in causing recapture, it is better where no supplemental mineral spirits are added.

IV. Accelerated Testing

A quantity of Alcoa Grade 6230 leafing aluminum pigment of 65% (non-volatiles) was divided into four samples. One served as a control and the others were mixed with Virco-Pet 20 material (VP), isostearic acid (Iso), and butyl alcohol in proportions as shown in Table IV under "Description", always based on aluminum weight.

The resulting aluminum pigment compositions were put in cans and the cans put in an oven at 110° F. After various periods of time from one week to four weeks, the compositions were removed and allowed to cool to room temperature. The individual compositions were then incorporated into Koppers 460 asphalt emulsion (at 2 pounds aluminum/gallon for a 65% NV) using Atlas G3300 surfactant at 6% based on weight of aluminum. The pigmented asphalt emulsions were applied as coatings on panels, dried, and tested for total reflectance. Total reflectance measurements are presented in Table IV.

TABLE IV

| Example No. | Description | Total Reflectance - Pigment aged at 110° F. for: | | | |
|---|---|---|---|---|---|
| | | 1 | 2 | 3 | 4 weeks |
| 21136-47A | 6230 control | 40 | 41.3 | 39.0 | 16.4 |
| 21136-47B | Virco Pet 20 at 10% on Al | 22.1 | — | — | — |
| 21136-47C | 10% VP 20 + 10% Iso | 35.8 | 34.5 | 33.9 | 32.9 |
| 21136-47D | 10% VP 20 + 10% Iso + 5% Butyl Alcohol | 35.0 | 32.4 | 31.0 | 31.8 |

As apparent from the data in Table IV, the total reflectance of the coating containing only the Virco-Pet 20 treated pigment subjected to 1 week of accelerated aging had been degraded to an unacceptable level.

After 4 weeks, the untreated pigment control coating had degraded.

Incorporation of isostearic kept total reflectance high compared to tests A and B under the rugged conditions of this test, even after 4 weeks.

V. Addition to the Coating

A quantity of Alcoa Grade 6232 leafing aluminum pigment of 67.6% NV (non-volatiles), manufactured on day zero and subsequently stored at room temperature, was divided into two samples 59 days from day zero. One served as a control and the other was mixed on day 59 with Virco-Pet 20 material (VP) and isostearic acid (Iso) in proportions as shown in Table V under "Description", always based on aluminum weight.

The control and the composition resulting from the mixing were put in cans and the cans put in an oven at 125° F. After aging for three weeks, the control and composition were removed, cooled to room temperature, and then incorporated into Koppers 460 asphalt emulsion (at 22.5 grams of pigment composition equal to 15.6 grams aluminum) per 101 grams of Koppers 460 asphalt emulsion using Atlas G3300 surfactant at 0.9 grams.

Example 21142-15A (the control), after shaking in the mixer, was foamy and brown in color. Bubbles were present.

TABLE V

| Example No. | Description |
|---|---|
| 21142-15A | 6232 control |
| 21142-15C | 10% VP 20 + 10% Iso* |

*Emery 871

The emulsion had broken. It was not spread on a panel for a total reflectance measurement, because to do so would have resulted in a patchy, unsatisfactory coating.

Example 21142-15C, in the emulsion, was spread on a panel, dried, and measured for total reflectance. Its total reflectance measurement was 32.8.

Two additional tests were made by adding to 100 grams of the broken asphalt emulsion resulting from Example 21142-15A and to 100 grams of the asphalt emulsion prepared from Example 21142-15C, 1.2 grams (10% based on the weight of aluminum in the mixture) of isostearic acid (Century 1105 of Union Camp). Following mixing, it was found that the coating mixture containing Example 21142-15A had re-emulsified; it was spread on a panel, dried, and measured for total reflectance, giving a reading of 37.0. The asphalt emulsion coating mixture containing Example 21142-15C, now having a total of 20% isostearic acid, based on the weight of aluminum, gave a total reflectance measurement of 35.3.

It will be understood that the above description of the present invention is susceptible to various modifications, changes and adaptations and the same are intended to be comprehended within the meaning and range of equivalence of the appended claims.

What is claimed is:

1. In a composition of matter comprising a pretreated metallic pigment having a leafing character, and an additive inhibiting reaction of the pigment to form hydrogen gas, the improvement comprising an effective amount, based on the metallic pigment content, of a liquid fatty acid to reverse, negate, or reduce loss of optical properties which would occur in the absence of such fatty acid.

2. A composition of matter as claimed in claim 1, wherein the liquid fatty acid comprises isostearic acid.

3. A composition of matter as claimed in claim 1, wherein the pigment comprises aluminum.

4. A composition of matter as claimed in claim 1, in the form of paste.

5. A composition of matter as claimed in claim 1, in the form of a water-borne coating.

6. A composition of matter as claimed in claim 5, in the form of an asphalt emulsion.

7. A composition of matter as claimed in claim 1, said optical properties comprising total reflectance in a coating.

8. In a water-borne coating containing pretreated metallic pigment having a leafing character, the improvement comprising an effective amount, based on the metallic pigment content, of a liquid fatty acid to reverse, negate, or reduce loss of optical properties which would occur in the absence of such fatty acid.

9. The coating as claimed in claim 8, wherein the coating comprises an asphalt emulsion.

10. A method for obtaining coatings of improved optical properties, said coatings including pretreated metallic pigment having a leafing character, comprising adding to a coating mixture an amount of liquid fatty acid effective for obtaining improved optical properties as compared with the coating without liquid fatty acid.

11. A method as claimed in claim 10, the coating mixture including asphalt emulsion comprising asphalt, water, and a wetting agent.

12. A method as claimed in claim 10, the liquid fatty acid being added to the coating mixture prior to the pigment.

13. A method as claimed in claim 10, the liquid fatty acid being added to the coating mixture in admixture with said pigment.

14. A method as claimed in claim 10, the liquid fatty acid being added to the coating mixture subsequent to addition of the pigment.

15. A composition of matter as claimed in claim 1, the liquid fatty acid being present at a level of 1 to 20% based on the weight of the pigment.

16. A composition of matter as claimed in claim 15, the liquid fatty acid being present at 10% based on the weight of the pigment.

* * * * *

UNITED STATES PATENT AND TRADEMARK OFFICE
CERTIFICATE OF CORRECTION

PATENT NO. : 4,522,655

DATED : June 11, 1985

INVENTOR(S) : Pamela L. Claassen and A. David Booz

It is certified that error appears in the above—identified patent and that said Letters Patent is hereby corrected as shown below:

Col. 1, line 12    Change "are" to --as--.

Col. 3, line 1     After "Koppers", insert --460--.

Col. 4, line 50    After "65%", insert --NV--.

Signed and Sealed this

Twentieth Day of August 1985

[SEAL]

Attest:

DONALD J. QUIGG

Attesting Officer    Acting Commissioner of Patents and Trademarks